US009250976B2

(12) United States Patent
Jacobs et al.

(10) Patent No.: US 9,250,976 B2
(45) Date of Patent: *Feb. 2, 2016

(54) TIERED LOCKING OF RESOURCES

(71) Applicant: International Business Machines Corporation, Armonk, NY (US)

(72) Inventors: Stuart Z. Jacobs, Lakeville, MN (US); David A. Larson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 383 days.

This patent is subject to a terminal disclaimer.

(21) Appl. No.: 13/804,201

(22) Filed: Mar. 14, 2013

(65) Prior Publication Data

US 2014/0115213 A1  Apr. 24, 2014

Related U.S. Application Data

(60) Provisional application No. 61/715,987, filed on Oct. 19, 2012.

(51) Int. Cl.
*G06F 12/00* (2006.01)
*G06F 9/46* (2006.01)
*G06F 9/52* (2006.01)

(52) U.S. Cl.
CPC ...... *G06F 9/524* (2013.01); *G06F 9/46* (2013.01); *G06F 9/526* (2013.01); *G06F 12/00* (2013.01)

(58) Field of Classification Search
USPC .......... 710/200, 36, 108, 241, 242, 243, 244; 718/104
See application file for complete search history.

(56) References Cited

U.S. PATENT DOCUMENTS

| 5,161,227 | A * | 11/1992 | Dias et al. ...................... 718/104 |
| 5,596,754 | A * | 1/1997 | Lomet ........................... 710/200 |
| 5,613,139 | A * | 3/1997 | Brady ............................ 710/200 |
| 5,682,537 | A * | 10/1997 | Davies et al. ................. 710/200 |
| 5,761,670 | A * | 6/1998 | Joy |
| 6,088,757 | A * | 7/2000 | Boonie et al. ................. 710/200 |
| 7,058,948 | B2 * | 6/2006 | Hoyle ............................ 718/104 |
| 2006/0224805 | A1* | 10/2006 | Pruscino et al. .............. 710/200 |
| 2010/0114849 | A1* | 5/2010 | Kingsbury et al. ............ 707/704 |
| 2010/0242043 | A1* | 9/2010 | Shorb ............................ 718/104 |
| 2012/0311604 | A1* | 12/2012 | Achterberg et al. .......... 718/107 |
| 2012/0311606 | A1* | 12/2012 | Marathe et al. ............... 718/107 |
| 2013/0080672 | A1* | 3/2013 | Tal et al. ....................... 710/200 |
| 2014/0189260 | A1* | 7/2014 | Wang et al. ................... 711/152 |

* cited by examiner

*Primary Examiner* — Khanh Dang
(74) *Attorney, Agent, or Firm* — James R. Nock; Owen J. Gamon

(57) ABSTRACT

In an embodiment, a lock command is received from a thread that specifies a resource. If tier status in a nodal lock indicates the nodal lock is currently owned, an identifier of the thread is added to a nodal waiters list, and if the thread's lock wait indicator indicates that the thread owns the nodal lock, then a successful completion status is returned for the lock command to the thread after waiting until a next tier wait indicator in the nodal lock indicates that any thread owns a global lock on the resource. If the tier status indicates no thread holds the nodal lock, the tier status is changed to indicate the nodal lock is owned, and if a global waiters and holder list is empty, an identifier of a node at which the thread executes is added to the global waiters and holder list.

20 Claims, 11 Drawing Sheets

TIERED LOCKING OF RESOURCES

CROSS-REFERENCE TO RELATED APPLICATIONS

This application claims the benefit of U.S. Provisional Application Ser. No. 61/715,987, filed Oct. 19, 2012, entitled "TIERED LOCKING PROTOCOL," and incorporated by reference herein in its entirety.

FIELD

An embodiment of the invention generally relates to computer systems and more particularly to a computer system that provides a tiered locking protocol for access to shared resources.

BACKGROUND

Computer systems typically comprise a combination of hardware, such as semiconductors, transistors, chips, and circuit boards, and computer programs. As increasing numbers of smaller and faster transistors can be integrated on a single chip, new processors are designed to use these transistors effectively to increase performance. Currently, many computer designers opt to use the increasing transistor budget to build ever bigger and more complex uni-processors. Alternatively, multiple smaller processor cores can be placed on a single chip, which is beneficial because a single, simple processor core is less complex to design and verify. This results in a less costly and complex verification process, as a once verified module, the processor, is repeated multiple times on a chip. Techniques such as multiple threads take advantage of multi-processors and access shared resources. Examples of shared resources are processors, memory, data in memory, co-processors, network bandwidth, or secondary storage.

SUMMARY

A method, computer-readable storage medium, and computer are provided. In an embodiment a lock command is received from a first thread that specifies a resource. If tier status in a nodal lock indicates the nodal lock is currently owned on global data, an identifier of the first thread is added to a nodal waiters list in the nodal lock, and if a lock wait indicator in the first thread indicates that the first thread owns the nodal lock on the global data, then a successful completion status is returned for the lock command to the first thread after waiting until a next tier wait indicator in the nodal lock indicates that any thread owns a global lock on the resource. If the tier status indicates no thread holds the nodal lock on the global data, the tier status is changed to indicate the nodal lock is owned, and if a global waiters and holder list in the global data is empty, an identifier of a first node at which the first thread executes is added to the global waiters and holder list, and the successful completion status for the lock command is returned to the first thread. If the tier status indicates no thread holds the nodal lock on the global data, the tier status is changed to indicate the nodal lock is owned, and if the identifier of the first node at which the first thread executes is in the global waiters and holder list, the identifier of the first node at which the first thread executes is added to a global pending waiters list in the global data, and the successful completion status for the lock command is returned to the first thread. If the tier status indicates no thread holds the nodal lock on the global data, the tier status is changed to indicate the nodal lock is owned, and if the identifier of the first node at which the first thread executes is not in the global waiters and holder list, the identifier of the first node at which the first thread executes is added to the global waiters and holder list, and the successful completion status for the lock command is returned to the first thread.

It is to be noted, however, that the appended drawings illustrate only example embodiments of the invention, and are therefore not considered a limitation of the scope of other embodiments of the invention.

DETAILED DESCRIPTION

As multi-processor computing systems have advanced, the number of computational cores and chips in systems has increased dramatically, so that every computational core in the system is not able to receive and snoop every transaction on the SMP (Symmetric Multi-Processing) fabric in a large system. Doing so would make the SMP fabric the bottleneck in the system and greatly limit the performance and consolidation advantages that large scale SMP systems provide. Modern SMP fabrics achieve their scaling capability by reducing and limiting the scope of their commands on the fabric when possible. Assuming that the firmware and software executing on the SMP is highly affinitized, this results in a SMP fabric that performs similar to a traditional flat SMP fabric.

One of the characteristic of these large scale SMP fabrics is that as the number of parallel consumers of a piece of data rises, the ability of a producer to efficiently modify that data decreases. Numerous attempts may be necessary before the producer can become the highest point of coherency for that data and successfully modify it, sometimes taking thousands if not tens of thousands of cycles. The number of parallel consumers of a piece of data is especially high for globally accessed memory areas. This is especially true for frequently accessed data such as global locks. The ability of the current lock holder to release a lock is greatly affected as contention on the lock increases. This causes the overall wait time for acquiring the lock to increase and can often lead to performance problems.

In an embodiment of the invention, lock algorithms use the following data: Each thread has its own local wait indicator that is used when waiting to obtain the first tier of the lock. Each data block associated with the first tier of the overall lock contains the following pieces of data (this tier is referred to, herein, as the nodal lock, and this data is referred to, herein, as the nodal data): a tier status, a waiters list (list of threads), and a next tier wait indicator. In an embodiment, an instance of the nodal data exists for each node (affinity domain) in the system.

The data block associated with the second tier of the overall lock contains the following pieces of data (this tier is referred to, herein, as the global lock, and this data is referred to, herein, as the global data): waiters and holder list (list of nodes), and pending waiters list (list of nodes). In an embodiment, the second tier is the highest tier in the overall tiered lock and therefore only one instance of the global data exists. This data is only accessed by the nodal lock holders from each node. Usage of the lock comprises the lock, try lock, and unlock algorithms described in the figures.

Figure 1:
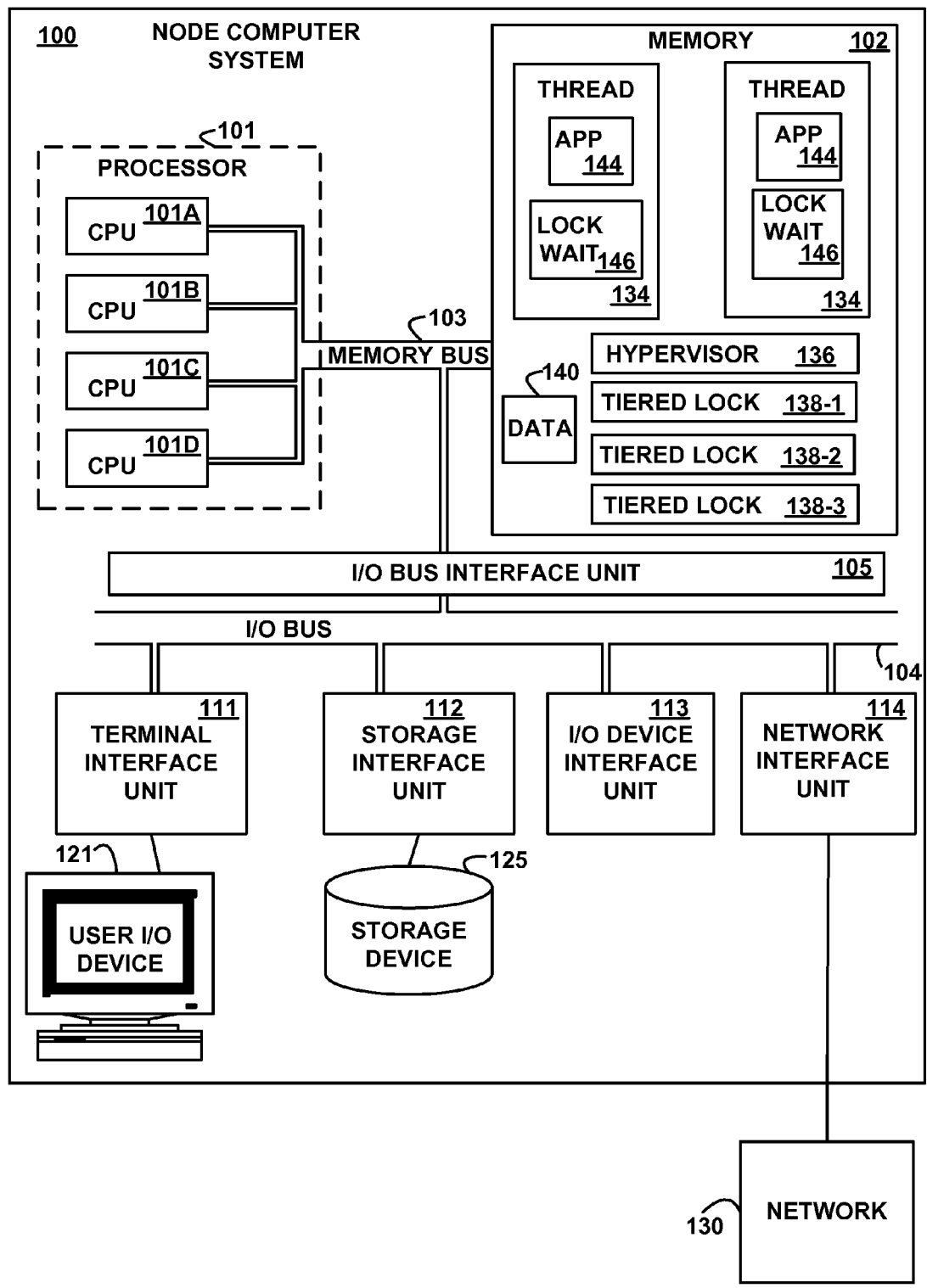
FIG. 1 depicts a high-level block diagram of an example system for implementing an embodiment of the invention.

Referring to the Drawings, wherein like numbers denote like parts throughout the several views, FIG. 1 depicts a high-level block diagram representation of a node computer system 100, according to an embodiment of the present invention. The mechanisms and apparatus of embodiments of the present invention apply equally to any appropriate computing system.

The major components of the node computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The node computer system 100 contains one or more general-purpose programmable central processing units (CPUs) 101A, 101B, 101C, and 101D, herein generically referred to as the processor 101. In an embodiment, the node computer system 100 contains multiple processors typical of a relatively large system; however, in another embodiment the node computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the node computer system 100, and may also include the virtual memory of other computer systems coupled to the node computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as comprising a plurality of threads 134 managed by a hypervisor 136. Although the threads 134 and the hypervisor 136 are illustrated as being contained within the memory 102 in the node computer system 100, in other embodiments some or all of them may be on different computer systems and may be accessed remotely, e.g., via the network interface unit 114. Further, the node computer system 100 may use virtual addressing mechanisms that allow the programs of the node computer system 100 to behave as if they only have access to a large, single storage entity instead of access to multiple, smaller storage entities. Thus, while the threads 134 and the hypervisor 136 are illustrated as residing in the memory 102, these elements are not necessarily all completely contained in the same storage device at the same time.

Each of the threads 134 comprises an application (app) 144 and a lock wait indicator 146. Any number of logical threads 134 may be supported, and the number of the logical threads 134 resident at any time in the computer 100 may change dynamically as threads are added or removed from the computer 100. Each of the threads 134 comprises instructions that execute on the processor 101 in a separate, or independent, memory space. In various embodiments, the application 144 is a user application, a third-party application, or any portion, multiple, or combination thereof. The application 144 comprises instructions that execute on the processor 101 or statements that are interpreted by instructions that execute on the processor 101. Each of the applications 144 may be the same or different from each other.

Although the hypervisor 136 is illustrated as being within the memory 102, in other embodiments, all or a portion of the hypervisor 136 may be implemented in firmware or hardware. The hypervisor 136 may perform both low-level management functions, such as page table management and may also perform higher-level management functions, such as creating and deleting the threads 134, concurrent I/O maintenance, and allocating/deallocating processors, memory and other hardware or program resources to/from the various threads 134. The hypervisor 136 controls the allocation of the shared resources to the threads 134 and the access of the shared resources by the threads, ensuring security and isolation of these threads within the node computer system.

The hypervisor 136 statically and/or dynamically allocates to each thread 134 a portion of the available resources in the computer 100. For example, each thread 134 may be allocated one or more of the processors 101 and/or one or more hardware threads on which to execute, as well as a portion of the available memory space to access. The logical threads 134 can share specific program and/or hardware resources such as the processors 101, such that a given resource may be utilized by more than one thread 134. In the alternative, program and hardware resources may be allocated to only one thread 134 at a time. Additional resources, e.g., mass storage, backup storage, user input, network connections, and the I/O adapters therefor, are typically allocated to one or more of the logical threads 134. Resources may be allocated in a number of manners, e.g., on a bus-by-bus basis, or on a resource-by-resource basis, with multiple logical threads 134 sharing resources on the same bus. Some resources may be allocated to multiple logical threads 134 at a time. The resources identified herein are examples only, and any appropriate resource capable of being allocated may be used.

In an embodiment, the threads 134 and/or the hypervisor 136 comprise instructions that execute on the processor 101 or statements that are interpreted by instructions executing on the processor 101 to perform the functions as further described below with reference to FIGS. 2, 3, 4, 5, 6, 7, 8, 9, 10, and 11. In another embodiment, the threads 134 and/or the hypervisor 136 may be implemented in microcode or firmware. In another embodiment, the hypervisor 136 may be implemented in hardware via logic gates, semiconductor devices, chips, circuits, circuit cards, and/or other physical hardware devices.

The memory 102 further comprises tiered locks 138-1, 138-2, and 138-3 and data 140. In an embodiment, the threads 134 use the tiered locks 138-1, 138-2, and/or 138-3 to lock (gain exclusive access to) the data 140 or any portion, multiple, or combination thereof. In another embodiment, the threads 134 use the tiered locks 138-1, 138-2, and/or 138-3 to lock (gain exclusive access to) a resource, such as the terminal interface unit 111, the storage interface unit 112, the I/O device interface unit 113, the network interface unit 114, the user I/O device 121, the storage device 125, the processor 101, any other hardware resource, or any portion, multiple, or combination thereof. Each of the tiered locks 138-1, 138-2 and 138-3 controls access to a different resource.

The memory bus 103 provides a data communication path or communications fabric for transferring data among the processor 101, the memory 102, and the I/O bus interface unit 105. In an embodiment, multiple node computer systems 100 may be connected via the same memory bus 103 or communications fabric. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices, which may comprise user output devices (such as a video display device, projectors, a speaker, and/or television set) and user input devices (such as a camera, a keyboard, a mouse, a keypad, a touchpad, a trackball, buttons, Radio Frequency Identifier Tags, a light pen, a finger, a stylus, or other pointing device). A user may manipulate the user input devices using a user interface, in order to provide input data and commands to the user I/O device 121 and the node computer system 100, and may receive output data via the user output devices. For example, a user interface may be presented via the user I/O device 121, such as displayed on a display device. The user I/O device 121 may be of any size and may accommodate multiple users viewing and touching the display device simultaneously or collaboratively, and in an embodiment, any user may touch at any location on the display device.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the node computer system 100 to other computer systems and digital devices.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the node computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the node computer system 100 is a multi-user mainframe computer system, a single-user system, or a server computer or similar device that has little or no direct user interface, but receives requests from other computer systems (clients). In other embodiments, the node computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable bus, network, or any multiple or combination thereof, and may support any appropriate protocol suitable for communication of data and/or code to/from the node computer system 100. In various embodiments, the network 130 may represent a storage device or a combination of storage devices, either connected directly or indirectly to the node computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable bus, network, or any multiple or combination thereof.

FIG. 1 is intended to depict the representative major components of the node computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the node computer system 100 and that, when read and executed by one or more processors in the node computer system 100 or when interpreted by instructions that are executed by one or more processors, cause the node computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
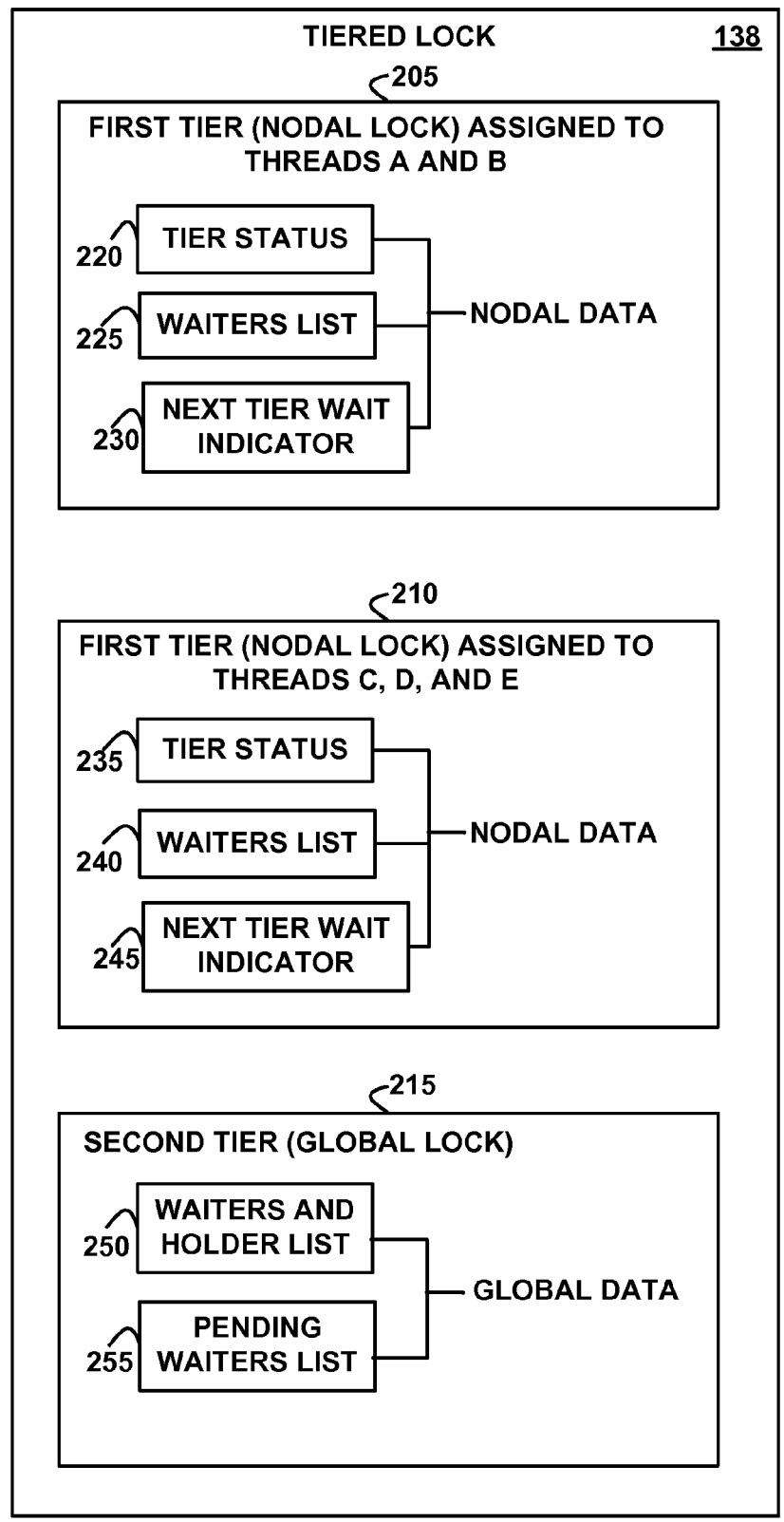
FIG. 2 depicts a block diagram of an example data structure for a tiered lock, according to an embodiment of the invention.

FIG. 2 depicts a block diagram of an example data structure for a tiered lock 138, according to an embodiment of the invention. The tiered lock 138 generically refers to the tiered locks 138-1, 138-2, and 138-3 (FIG. 1). The tiered lock 138 comprises a first tier (nodal lock) 205, which is assigned to threads A and B of the threads 134, a first tier (nodal lock) 210, which is assigned to threads C, D, and E of the threads 134, and a second tier (global lock) 215. The first tier (nodal lock) 205 comprises tier status 220, a waiters list 225, and a next tier wait indicator 230, all of which are referred to herein as nodal data. The first tier (nodal lock) 210 comprises tier status 235, a waiters list 240, and a next tier wait indicator 245, all of which are referred to herein as nodal data. The second tier 215 comprises a waiters and holder list 250 and a pending waiters list 255, which are referred to herein as global data. The tier status 220 comprises an indication of whether any thread (any of the threads A or B, which are examples of the threads 134, that are assigned to the first tier nodal lock 205) holds or does not hold a lock on the first tier nodal lock 205. In various embodiments, the tier status 220 may comprise an indication of true or false, yes or no, on or off, or one or zero.

The waiters list 225 comprises a list of thread identifiers that identify threads (a subset of the threads A and B that are assigned to the first tier nodal lock 205) that are waiting to obtain a lock on the first tier nodal lock 205 and do not currently hold a lock on the first tier nodal lock 205. The next tier wait indicator 230 comprises an indication that indicates whether or not the thread that holds a first tier nodal lock 205 holds or owns a global lock on the second tier global lock 215.

The tier status 235 comprises an indication of whether any thread (any of the threads C, D, and E, which are examples of the threads 134, that are assigned to the first tier nodal lock 210) holds or does not hold a lock on the first tier nodal lock 210. In various embodiments, the tier status 235 may specify an indication of true or false, yes or no, on or off, or one or zero. The waiters list 240 comprises a list of thread identifiers that identify threads (a subset of the threads C, D, and E that are assigned to the first tier nodal lock 210) that are waiting to obtain a lock on the first tier nodal lock 210 and do not currently hold a lock on the first tier nodal lock 210. The next tier wait indicator 245 comprises an indication that indicates whether or not any thread (any of the threads C, D, or E that are assigned to the first tier nodal lock 210) has a global lock on the second tier global lock 215. Holding a lock on the first tier (nodal lock) 205 or 210 means that the thread 134 that holds the nodal lock is allowed to access (read and/or write) the global data. A thread that does not hold a nodal lock is not allowed to access the global data. Holding a lock on the second tier (global lock) 215 means that the thread 134 that holds the global lock is allowed to access (read and/or write) the resource represented by the global lock. A thread that does not hold a global lock is not allowed to access the resource.

The waiters and holder list 250 comprises a list of one or more identifiers of the nodes 100 that comprise one or more threads 134 that either are waiting to obtain a lock on the second tier global lock 215 or that actually hold a lock on the second tier global lock 215. In an embodiment, only one thread actually holds a lock on the second tier global lock 215, so the lock is exclusive. The pending waiters list 255 comprises a list of one or more identifiers of nodes 100 that comprise one or more threads 134 that are waiting to obtain a lock on the second tier global lock 215, that are not present in the waiters and holder list 250, and that are pending (waiting) to be added to the waiters and holder list 250. The thread that holds or owns the lock on the second tier (global lock) 215 is exclusively allowed to access (read and/or write) the resource that the tiered lock 138 represents.

Figure 3:
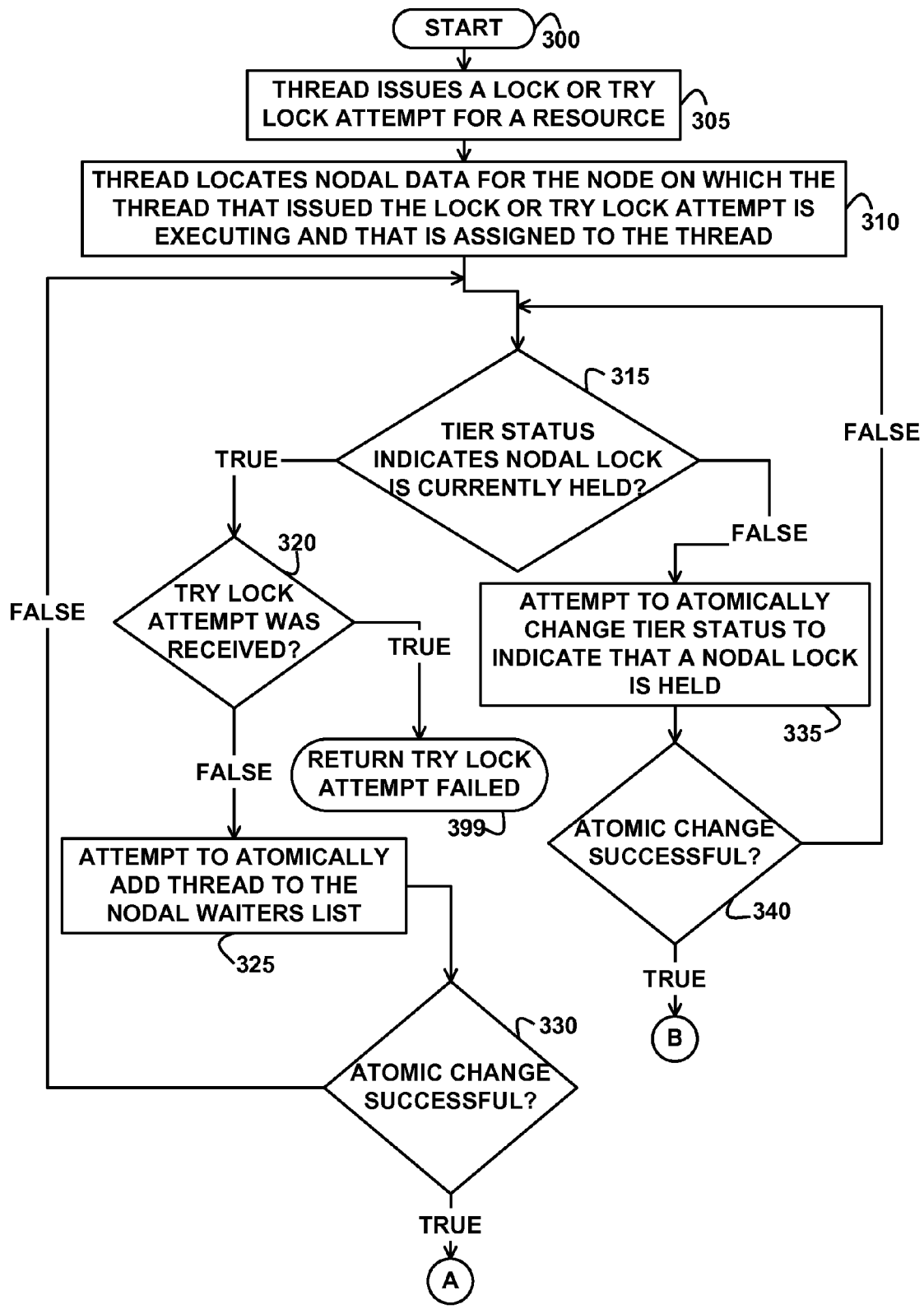
FIG. 3 depicts a flowchart of example processing for locking and try locking, according to an embodiment of the invention.

FIG. 3 depicts a flowchart of example processing for locking and try locking, according to an embodiment of the invention. Control begins at block 300. Control then continues to block 305 where an issuing thread 134 issues a lock or try lock attempt command, which identifies a resource that the issuing thread 134 desires to lock. For a lock command, the issuing thread 134 halts execution and waits to continue execution until the issuing thread 134 obtains a lock on the resource. For a try lock attempt command, the issuing thread 134 does not wait to obtain the lock and instead continues execution, possibly on an alternative control flow path, if the issuing thread 134 does not obtain a lock on the resource. Control then continues to block 310 where, in response to the lock or try lock attempt command, the issuing thread 134 locates the tiered lock 138-1, 138-2, or 138-3 assigned to the resource and the nodal data in the tiered lock 138-1, 138-2, or 138-3 assigned to the node on which the issuing thread 134 is executing and that is assigned to the issuing thread 134.

Control then continues to block 315 where the issuing thread 134 determines whether the tier status 220 or 235 of the located tiered lock indicates that a nodal lock is currently held by any thread. If the determination at block 315 is true, then a nodal lock is currently held by some thread, so control continues to block 320 where the issuing thread 134 determines whether the command issued by the issuing thread 134 is a try lock attempt command. If the determination at block 320 is true, then the command issued by the issuing thread 134 is a try lock attempt command, so control continues to block 399 where the issuing thread 134 returns a status, indicating that the try lock attempt command failed because the issuing thread 134 cannot immediately obtain a global lock on the requested resource since the tier status 220 or 235 indicates a nodal lock is currently held and a try lock attempt command means that the issuing thread 134 does not want to wait for the lock.

If the determination at block 320 is false, then the command that the issuing thread 134 issued is a lock command, which means the issuing thread 134 is willing to wait for a lock on the resource, so control continues to block 325 where the issuing thread 134 attempts to atomically change the nodal waiters list 225 or 240 by attempting to add an identifier of the issuing thread 134 to the nodal waiters list 225 or 240. Control then continues to block 330 where the issuing thread 134 determines whether the atomic change to the nodal waiters list 225 or 240 was successful. If the determination at block 330 is true, then the atomic change to the nodal waiters list 225 or 240 was successful, as no other thread attempted to change the nodal waiters list 225 or 240 at the same time as the issuing thread 134 and the identifier of the issuing thread was added to the nodal waiters list 225 or 240, indicating that the issuing thread is waiting to obtain a nodal lock, so control continues to block 405 of FIG. 4, as further described below.

If the determination at block 330 is false, then the atomic change to the nodal waiters list 225 or 240 was unsuccessful, as another thread attempted to change the nodal waiters list 225 or 240 at the same time as the issuing thread 134 (multiple threads may attempt to modify the same nodal lock simultaneously, but only one thread is allowed to do so), so control returns to block 315, as previously described above. Thus, for a lock command, the issuing thread 134 attempts to add an identifier of the issuing thread 134 to the nodal waiters list 225 or 240 until the attempted add (at block 325) is successful (at block 330) (no other thread is attempting to access the nodal waiters list 225 or 240 at the same time) or until the tier status 220 or 235 (at block 315) indicates that the nodal lock is not currently held.

If the determination at block 315 is false, then the tier status 220 or 235 indicates that a nodal lock is not currently held by any thread, so control continues to block 335 where the issuing thread 134 attempts to atomically change the tier status 220 or 235 to indicate a nodal lock is held. Control then continues to block 340 where the issuing thread 134 determines whether the atomic change to the tier status 220 or 235 was successful. If the determination at block 340 is true, then the atomic change to the tier status 220 or 235 to indicate a nodal lock is held was successful, as no other thread attempted to change the nodal lock at the same time as the issuing thread 134, so control continues to block 505 of FIG. 5, as further described below. If the determination at block 340 is false, then the atomic change to the tier status 220 or 235 was unsuccessful, as another thread attempted to change the tier status 220 or 235 at the same time as the issuing thread 134 (multiple threads may attempt to modify the same nodal lock simultaneously, but only one thread is allowed to do so), so control returns to block 315, as previously described above. Thus, for a lock command or a try lock attempt command, so long as the tier status 220 or 235 indicates a nodal lock is not currently held (the false leg of block 315), the issuing thread 134 attempts to change the nodal tier status 220 or 235 to indicate a nodal lock is held until the attempted change is successful (the true leg of block 340) (no other thread is attempting to access the tier status 220 or 235 at the same time).

Figure 4:
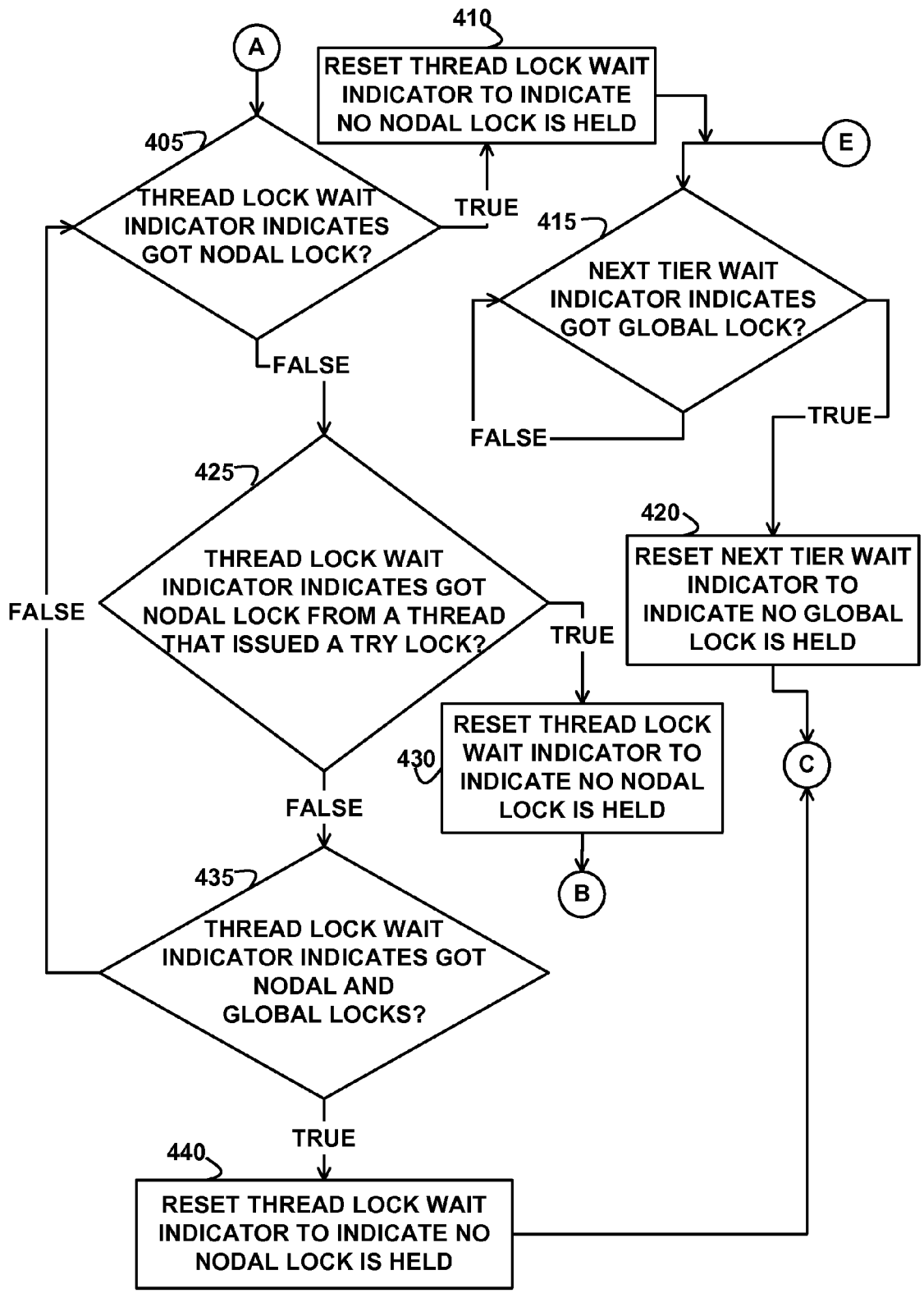
FIG. 4 depicts a flowchart of further example processing for locking, according to an embodiment of the invention.

FIG. 4 depicts a flowchart of further example processing for locking, according to an embodiment of the invention. Control flow enters the logic of FIG. 4 at block 405 from the true leg of block 330 (FIG. 3). At block 405, the issuing thread 134 determines whether the thread lock wait indicator 146 indicates that the issuing thread 134 holds the nodal lock. If the determination at block 405 is true, then the thread lock wait indicator 146 indicates that the issuing thread 134 holds the nodal lock, so control continues to block 410 where the issuing thread 134 resets the thread lock wait indicator 146 of the issuing thread 134 for use the next time the issuing thread 134 becomes a waiter to indicate that the issuing thread 134 does not hold a nodal lock. Control then continues to block 415 where the issuing thread 134 determines whether the next tier wait indicator 230 or 245 indicates that any thread holds or owns the global lock 215. If the determination at block 415 is true, then the next tier wait indicator 230 or 245 indicates that some thread holds or owns the global lock 215, so control continues to block 420 where the issuing thread 134 resets the next tier wait indicator 230 or 245 for use by the next nodal waiter to indicate that no global lock on the global lock 215 is held or owned by any thread. Control then continues to block 599 of FIG. 5 where the issuing thread 134 returns a successful lock or try lock attempt completion status, indicating that the issuing thread 134 now holds or owns an exclusive lock on the requested resource represented by the global lock 215, so the issuing thread may exclusively access the requested resource. If the determination at block 415 is false, then the next tier wait indicator 230 or 245 indicates that no global lock on the global lock 215 is held or owned by any thread, so control returns to block 415 where the issuing thread 134 again determines whether the next tier wait indicator 230 or 245 indicates that any thread has a global lock on the global lock 215, as previously described above.

If the determination at block 405 is false, then the thread lock wait indicator 146 indicates that the issuing thread 134 does not hold or own the nodal lock, so control continues to block 425 where the issuing thread 134 determines whether the thread lock wait indicator 146 of the issuing thread 134 indicates the issuing thread 134 holds or owns a nodal lock that was received from another thread that issued a try lock attempt command. If the determination at block 425 is true, then the thread lock wait indicator 146 of the issuing thread 134 indicates the issuing thread 134 holds or owns a nodal lock received from another thread issuing a try lock attempt command, so control continues to block 430 where the issuing thread 134 resets the thread lock wait indicator 146 of the issuing thread 134 for use the next time the issuing thread 134 becomes a waiter to indicate that the issuing thread 134 does not hold a nodal lock. Control then continues to block 505 of FIG. 5, as further described below.

If the determination at block 425 is false, then the thread lock wait indicator 146 of the issuing thread 134 indicates the issuing thread 134 does not hold or own a nodal lock received from another thread issuing a try lock attempt command, so control continues to block 435 where the issuing thread 134 determines whether the thread lock wait indicator 146 of the issuing thread 134 indicates that the issuing thread 134 holds or owns both a nodal lock and a global lock. If the determination at block 435 is true, then the thread lock wait indicator 146 of the issuing thread 134 indicates that the issuing thread 134 holds or owns both a nodal lock and a global lock, so control continues to block 440 where the issuing thread 134 resets the thread lock wait indicator 146 for use the next time the issuing thread 134 becomes a waiter to indicate the issuing thread 134 does not have, hold, or own a nodal lock. Control then continues to block 599 of FIG. 5 where the issuing thread 134 returns a successful lock or try lock complete return status to the issuing thread 134, indicating that the issuing thread 134 now holds or owns an exclusive lock on the requested resource represented by the global lock 215. If the determination at block 435 is false, then the thread lock wait indicator 146 of the issuing thread 134 does not indicate that the issuing thread 134 has, holds, or owns nodal and global locks, so control returns to block 405, as previously described above.

Figure 5:
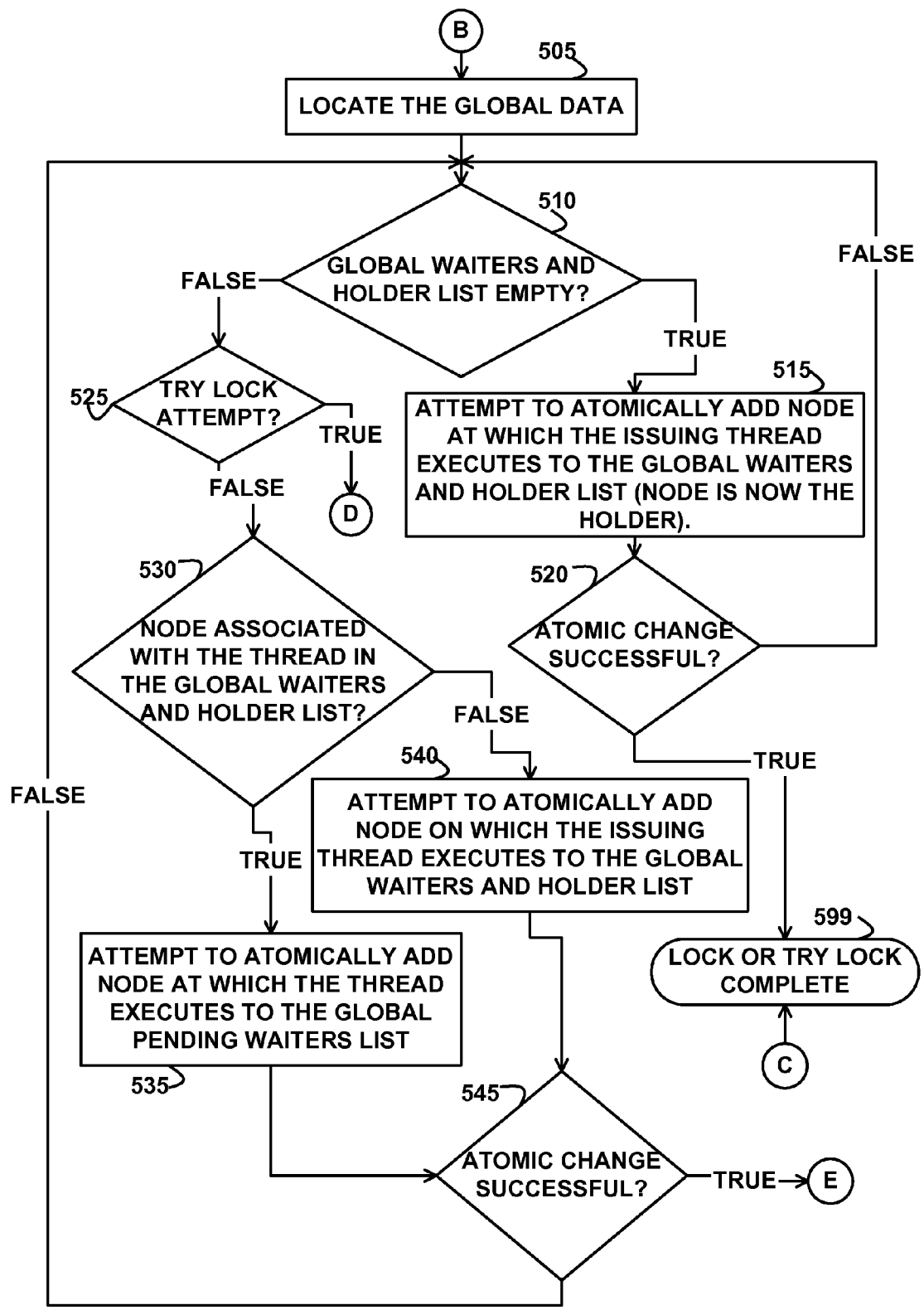
FIG. 5 depicts a flowchart of further example processing for locking, according to an embodiment of the invention.

FIG. 5 depicts a flowchart of further example processing for locking, according to an embodiment of the invention. Control flow enters the logic of FIG. 5 at block 505 from block 340 of FIG. 3 or block 430 of FIG. 4. At block 505, the issuing thread 134 locates or finds the global data in the tier lock assigned to the issuing thread 134. Control then continues to block 510 where the issuing thread 134 determines whether the global waiters and holder list 250 is empty. If the determination at block 510 is true, then the global waiters and holder list 250 is empty and no thread on any node owns a global lock on the requested resource and no thread on any node is waiting for a global lock on the requested resource, so control continues to block 515 where the issuing thread 134 attempts to atomically add an identifier of the node at which the issuing thread 134 executes to the global waiters and holder list 250, in order to identify the node as the holder of the global lock on the requested resource. Control then continues to block 520 where the issuing thread 134 determines whether the atomic change was successful. If the determination at block 520 is true, then the atomic change to the global waiters and holder list 250 was successful and no other thread accessed the global waiters and holder list 250 at the same time as the issuing thread 134, so control continues to block 599 where the issuing thread 134 returns a successful lock or try lock completion status, indicating that the issuing thread 134 now holds or owns an exclusive global lock on the requested resource. If the determination at block 520 is false, then the atomic change to the global waiters and holder list 250 was unsuccessful, as another thread accessed the global waiters and holder list 250 at the same time as the atomic change attempted by the issuing thread 134, so control returns to block 510, as previously described above. In this way, so long as the global waiters and holder list 250 is empty (true leg of block 510) and the atomic change is unsuccessful (the false leg of block 520), the issuing thread 134 continues to attempt to atomically add an identifier of the node on which the issuing thread 134 executes to the global waiters and holder list 250 (block 515).

If the determination at block 510 is false, then the global waiters and holder list 250 is not empty, so control continues to block 525 where the issuing thread 134 determines whether the command that the issuing thread 134 issued is a try lock attempt command. If the determination at block 525 is true, then the command issued by the issuing thread 134 is a try lock attempt command, so control continues to block 605 of FIG. 6, as further described below. If the determination at block 525 is false, then the command issued by the issuing thread 134 is a lock command, so control continues to block 530 where the issuing thread 134 determines whether an identifier of the node at which the issuing thread 134 executes is already stored in the global waiters and holder list 250. If the determination at block 530 is true, then an identifier of the node at which the issuing thread 134 executes is already stored in the global waiters and holder list 250, so control continues to block 535 where the issuing thread 134 attempts to atomically add an identifier of the node at which the issuing thread 134 executes to the global pending waiters list 255. Control then continues to block 545 where the issuing thread 134 determines whether the attempted change of the global pending waiters list 255 was successful. If the determination at block 545 is true, then the issuing thread 134 successfully atomically added the identifier of the node at which the issuing thread 134 executes to the global pending waiters list 255, as no other threads attempted to access the global pending waiters list 255 at the same time as the issuing thread 134, so control continues to block 415 of FIG. 4, as previously described above.

If the determination at block 545 is false, then the issuing thread 134 was unsuccessful in atomically adding the identifier of the node at which the issuing thread 134 executes to the global pending waiters list 255, as another thread accessed the global pending waiters list 255 at the same time as the issuing thread 134, so control returns to block 510, as previously described above. If the determination at block 530 is false, then an identifier of the node at which the issuing thread 134 executes is not already stored in the global waiters and holder list 250, so control continues to block 540 where the issuing thread 134 attempts to atomically add the identifier of the node at which the issuing thread 134 executes to the global waiters and holder list 250. Control then continues to block 545 where the issuing thread 134 determines whether the attempted add of the identifier of the node at which the issuing thread 134 executes to the global waiters and holder list 250 was successful. If the determination at block 545 is true, then the addition of the identifier of the node at which the issuing thread 134 executes to the global waiters and holder list 250 was successful, so control continues to block 415 of FIG. 4, as previously described above. If the determination at block 545 is false, then the addition of the identifier of the node at which the issuing thread 134 executes to the global waiters and holder list 250 was unsuccessful, as another thread attempted to access the global waiters and holder list 250 at the same time as the issuing thread 134, so control returns to block 510, as previously described above.

Figure 6:
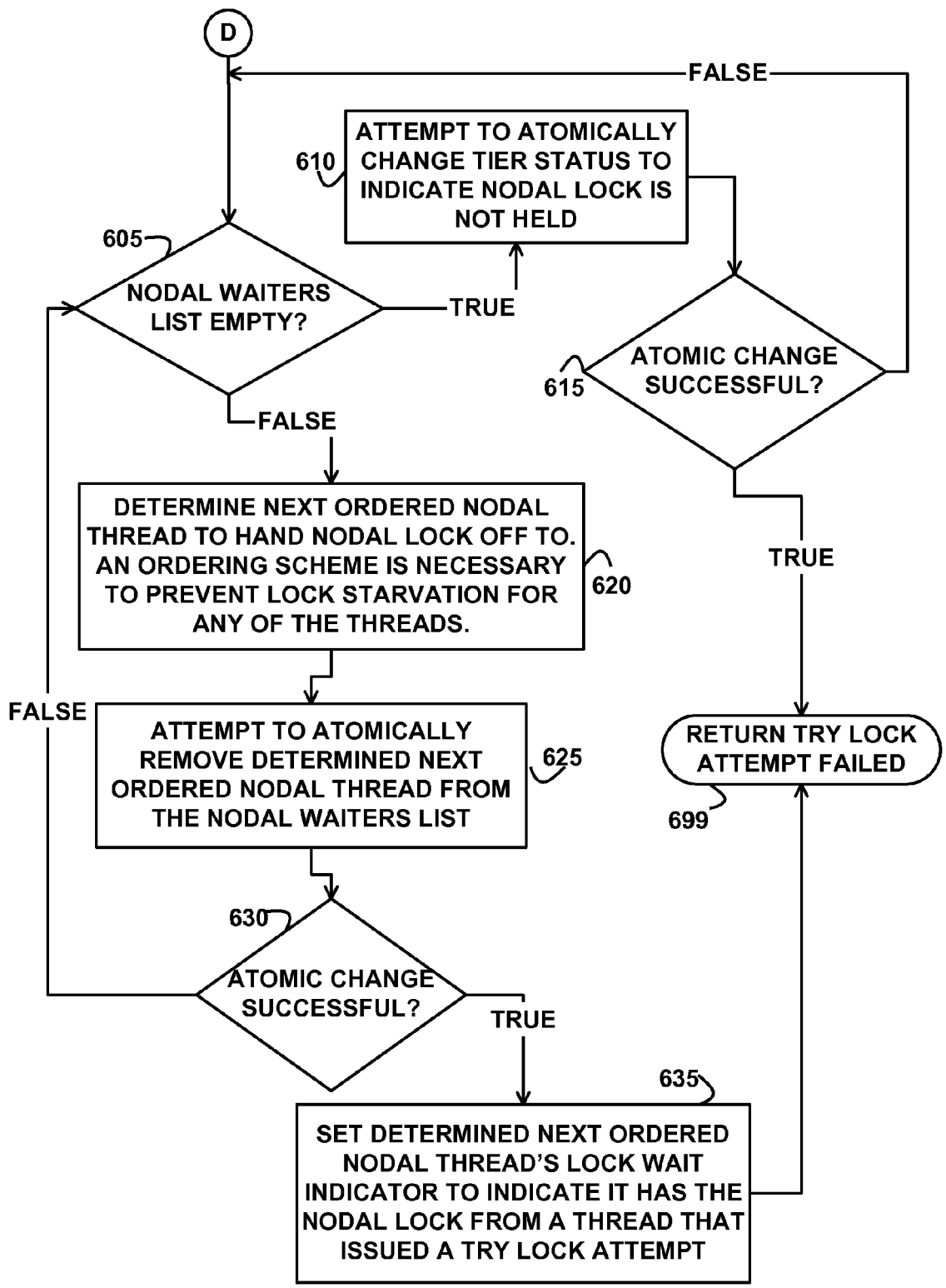
FIG. 6 depicts a flowchart of further example processing for locking, according to an embodiment of the invention.

FIG. 6 depicts a flowchart of further example processing for locking, according to an embodiment of the invention. Control flow enters the logic of FIG. 6 from the true leg of block 525, as previously described above with reference to FIG. 5. Referring again to FIG. 6, control begins at block 605 where the issuing thread 134 determines whether the nodal waiters list 225 or 240 is empty. If the determination at block 605 is true, then the nodal waiters list 225 or 240 is empty and no threads are waiting for a nodal lock on the tiered lock that locks the requested resource, so control continues to block 610 where the issuing thread 134 attempts to atomically change the tier status 220 or 235 to indicate that a nodal lock is not held by any thread. Control then continues to block 615 where the issuing thread 134 determines whether the atomic change attempt to the tier status 220 or 235 was successful. If the determination at block 615 is true, then the atomic change attempt to the tier status 220 or 235 was successful, as no other threads attempted to access the tier status 220 or 235 at the same time as the issuing thread 134, so control continues to block 699 where the issuing thread 134 returns a try lock attempt failed completion status, indicating that the try lock attempt command failed and a lock was not obtained, so the thread that issued the try lock attempt command is not allowed to access the specified resource. If the determination at block 615 is false, then the atomic change attempt was unsuccessful, as another thread accessed the tier status 220 or 235 at the same time as the issuing thread 134, so control returns to block 605, as previously described above.

If the determination at block 605 is false, then the nodal waiters list 225 or 240 is not empty and at least one thread is waiting for a nodal lock on the tiered lock that represents the requested resource, so control continues to block 620 where the issuing thread 134 determines the next ordered nodal thread to which to give a nodal lock. A nodal thread is a thread that executes at the same node as the issuing thread 134. The issuing thread 134 creates an ordered list of threads at each node, in order to prevent lock starvation of the threads (in order to prevent a condition where no thread ever receives a lock). The thread ordering may follow any defined ordering scheme and the defined ordering scheme must be used by all threads making decisions based on thread ordering. Control then continues to block 625 where the issuing thread 134 attempts to atomically remove the determined next ordered nodal thread from the nodal waiters list 225 or 240. Control then continues to block 630 where the issuing thread 134 determines whether the attempted removal of the identifier of the determined next ordered nodal thread from the waiters list 225 or 240 was successful. If the determination at block 630 is true, then the attempted removal of the identifier of the determined next ordered nodal thread from the waiters list 225 or 240 was successful, as no other thread accessed the waiters list 225 or 240 at the same time as the issuing thread 134, so control continues to block 635 where the issuing thread 134 sets the determined next ordered nodal thread's lock wait indicator 146 to indicate that the determined next ordered nodal thread has obtained the nodal lock for the requested resource and the determined next ordered nodal thread obtained the nodal lock from the issuing thread 134 that issued a try lock attempt command. Control then continues to block 699 where the issuing thread 134 returns a try lock attempted failed completion status, indicating that the try lock attempt command failed and the issuing thread 134 did not obtain a lock. If the determination at block 630 is false, then the attempted atomic change to the waiters list 225 or 240 was unsuccessful, as another thread accessed the waiters list 225 or 240 at the same time as the issuing thread 134, so control returns to block 605, as previously described above.

Figure 7:
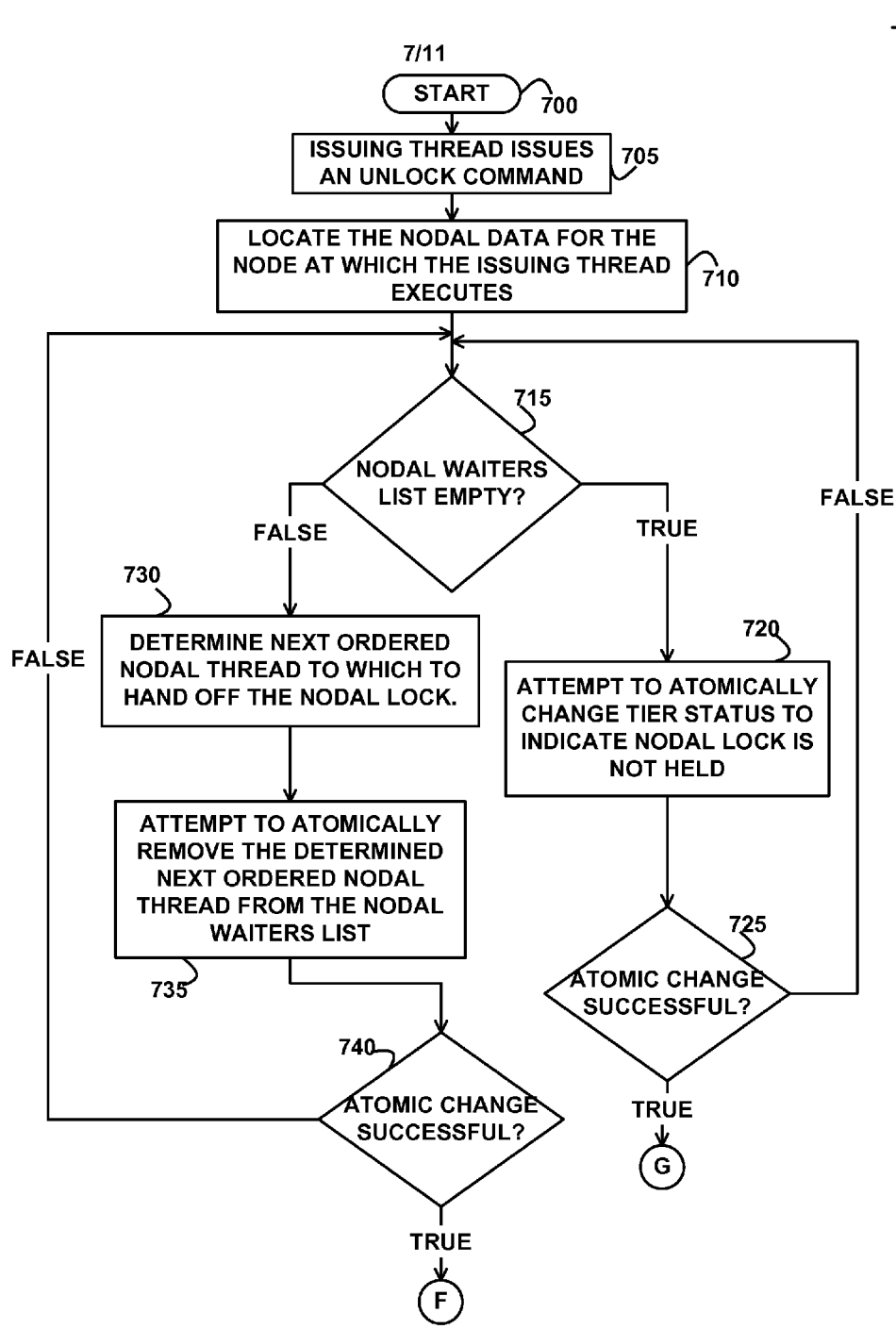
FIG. 7 depicts a flowchart of example processing for unlocking, according to an embodiment of the invention.

FIG. 7 depicts a flowchart of example processing for unlocking a resource using a tiered lock, according to an embodiment of the invention. Control begins at block 700. Control then continues to block 705 where an issuing thread 134 issues an unlock command that identifies a resource on which the issuing thread 134 owns or holds a lock and the issuing thread desires to unlock. Control then continues to block 710 where, in response to the issuing of the unlock command, the issuing thread 134 locates the nodal data in the tiered lock 138 for the node at which the issuing thread 134 executes and that is assigned to the issuing thread and to the resource that the issuing thread requests to unlock. Control then continues to block 715 where the issuing thread 134 determines whether the nodal waiters list 225 or 240 in the found nodal data is empty. If the determination at block 715 is true, then the nodal waiters list 225 or 240 is empty and no thread is waiting to obtain a lock on the nodal data for the requested resource, so control continues to block 720 where the issuing thread 134 attempts to change the tier status 220 or 235 to indicate that a nodal lock is not held by any thread. Control then continues to block 725 where the issuing thread 134 determines whether the attempted atomic change of the tier status 220 or 235 was successful. If the determination at block 725 is true, then the attempted atomic change of the tier status 220 or 235 to indicate that a nodal lock is not held by any thread was successful, as no other thread attempted to change the tier status 220 or 235 at the same time as the issuing thread 134, so control continues to block 1005 of FIG. 10, as further described below. If the determination at block 725 is false, then then the attempted atomic change of the tier status 220 or 235 to indicate that a nodal lock is not held by any thread was unsuccessful, as another thread accessed the tier status 220 or 235 at the same time as the issuing thread 134, so control returns to block 715, as previously described above.

If the determination at block 715 is false, then the nodal waiters list 225 or 240 is not empty and at least one thread is waiting to obtain a nodal lock on the tiered lock for the requested resource, so control continues to block 730 where the issuing thread 134 determines the next ordered nodal thread to which to hand off the nodal lock. Control then continues to block 735 where the issuing thread 134 attempts to atomically remove the determined next ordered nodal thread from the nodal waiters list 225 or 240. Control then continues to block 740 where the issuing thread 134 determines whether the attempted removal of the determined next ordered nodal thread from the nodal waiters list 225 or 240 was successful. If the determination at block 740 is true, then the attempted removal of the determined next ordered nodal thread from the nodal waiters list 225 or 240 was successful, as no other thread attempted to access the nodal waiters list 225 or 240 at the same time, so control continues to block 805 of FIG. 8, as further described below. If the determination at block 740 is false, then the atomic change was unsuccessful, as another thread accessed the nodal waiters list 225 or 240 at the same time as the attempted change to the nodal waiters list 225 or 240 by the issuing thread 134, so control returns to block 715, as previously described above.

Figure 8:
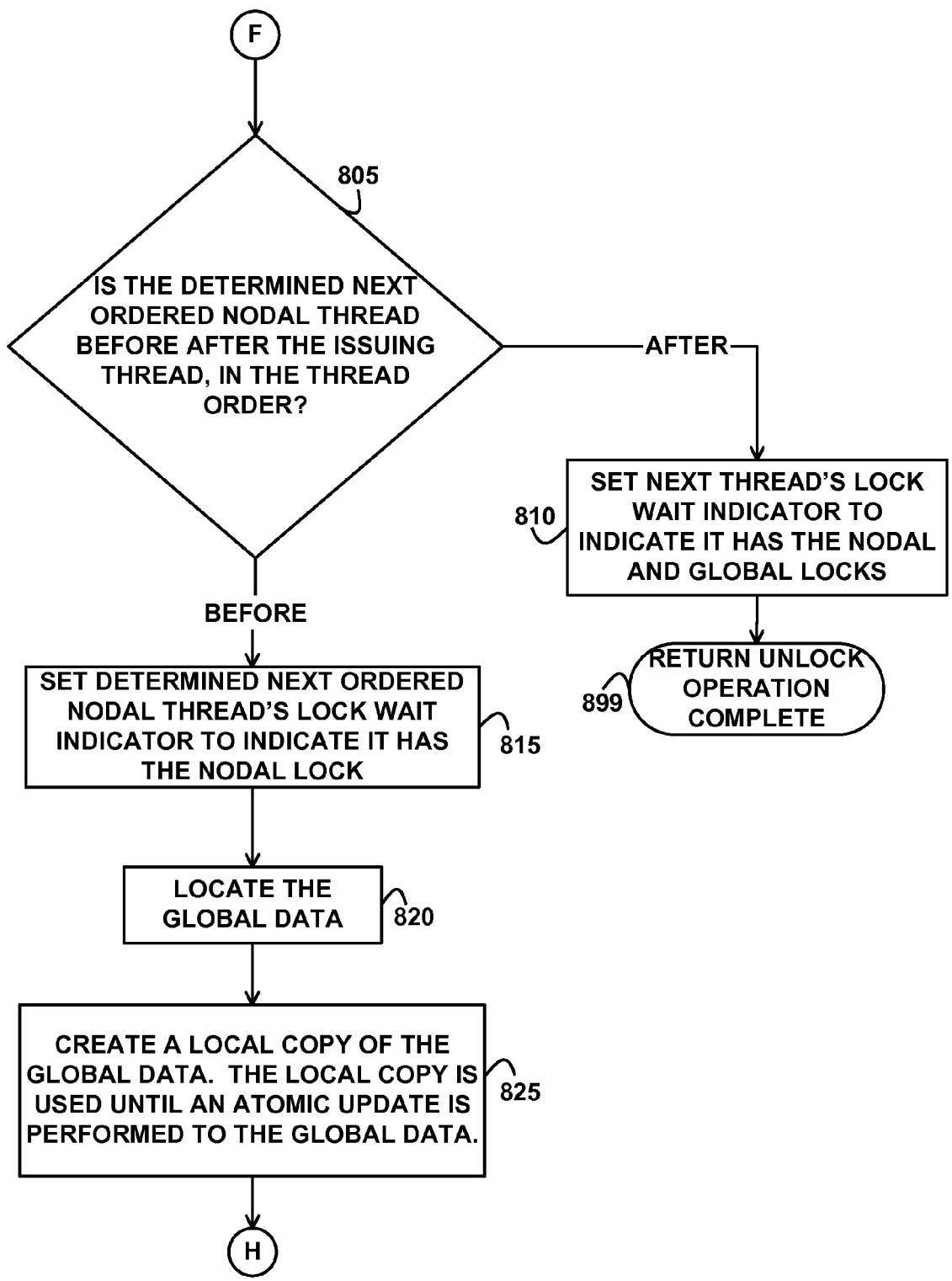
FIG. 8 depicts a flowchart of further example processing for unlocking, according to an embodiment of the invention.

FIG. 8 depicts a flowchart of further example processing for unlocking, according to an embodiment of the invention. Control flow enters FIG. 8 at block 805 from block 740 of FIG. 7, as previously described above. Referring again to FIG. 8, at block 805, the issuing thread 134 determines whether the determined next ordered nodal thread is before or after the issuing thread 134 in the thread order. If the determined next ordered nodal thread is after the issuing thread 134 in the thread order, then control continues to block 810 where the issuing thread 134 sets the determined next ordered nodal thread's lock wait indicator 146 to indicate that the determined next ordered nodal thread owns both the nodal lock and the global lock. Control then continues to block 899 where the issuing thread 134 returns a successful unlock operation completion status, and the issuing thread is no longer allowed to access the resource that was unlocked. If the determined next ordered nodal thread is before the issuing thread 134 in the thread order, then control continues from block 805 to block 815 where issuing thread 134 sets the determined next ordered nodal thread's lock wait indicator 146 to indicate that the determined next ordered nodal thread owns the nodal lock. Control then continues to block 820 where the issuing thread 134 locates the global data in the same tiered lock as the nodal lock. Control then continues to block 825 where the issuing thread 134 creates a local copy of the located global data. The issuing thread 134 uses the local copy until the issuing thread 134 performs an atomic update of the local copy to the global data, as further described below. Control then continues to block 905 of FIG. 9, as further described below.

Figure 9:
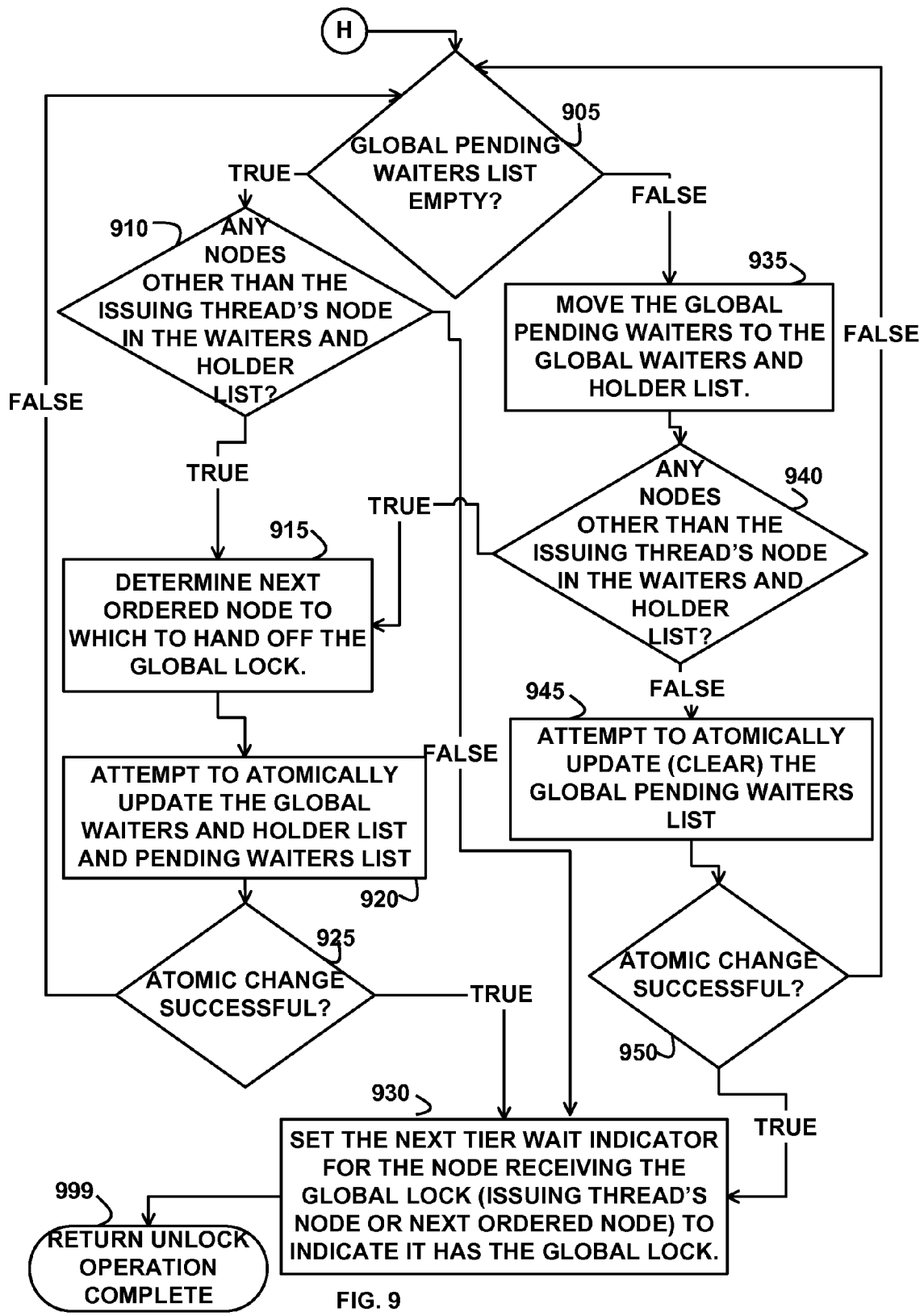
FIG. 9 depicts a flowchart of further example processing for unlocking, according to an embodiment of the invention.

FIG. 9 depicts a flowchart of further example processing for unlocking, according to an embodiment of the invention. Control flow enters the logic of FIG. 9 at block 905 from block 825 of FIG. 8. At block 905, the issuing thread 134 determines whether the global pending waiters list 255 is empty. If the determination at block 905 is true, then the global pending waiters list 255 is empty, so control continues to block 910 where the issuing thread 134 determines whether any node other than the node on which the issuing thread 134 executes is identified in the waiters and holder list 250. If the determination at block 910 is true, then at least one node, other than the node on which the issuing thread 134 executes, is identified in the waiters and holder list 250, so control continues to block 915 where the issuing thread 134 determines the next ordered node to which to hand off the global lock, in the ordered list of nodes. Control then continues to block 920 where the issuing thread 134 attempts to atomically update the global waiters and holder list 250 and the pending waiters list 255 with the local copy of the global data. That is, the issuing thread 134 attempts to copy the local copy of the global data to the global data. Control then continues to block 925 where the issuing thread 134 determines whether the attempted copy of the local copy of the global data to the global data is successful. If the determination at block 925 is true, then the issuing thread 134 successfully copied the local copy of the global data to the global data, so control continues to block 930 where the issuing thread 134 sets the next tier wait indicator 230 or 245 for the node receiving the global lock (the issuing thread's node or next ordered node, depending on which node received the global lock) to indicate that node owns the global lock 215. Control then continues to block 999 where the issuing thread 134 returns a successful unlock operation completion status to the issuing thread 134, and the issuing thread is no longer allowed to access the unlocked resource.

If the determination at block 925 is false, then the issuing thread 134 did not successfully copy the local copy of the global data to the global data because another thread was accessing the global data at the same time as the attempted copy, so control returns to block 905, as previously described above. If the determination at block 910 is false, then no node, other than possibly the node on which the issuing thread 134 executes, is identified in the waiters and holder list 250, so the issuing thread owns the global lock 215 and control continues to block 930 where the issuing thread 134 sets the next tier wait indicator for the node at which the issuing thread 134 executes to indicate that node owns the global lock 215, as previously described above.

If the determination at block 905 is false, then the global pending waiters list 255 is not empty, so control continues to block 935 where the issuing thread 134 moves the global pending waiters in the global pending waiters list 255 (the local copy) to the global waiters and holder list 250 (the local copy) and clears the global pending waiters list 255 (the local copy) after the move. Control then continues to block 940 where the issuing thread 134 determines whether any nodes, other than the node at which the issuing thread 134 executes, is in the waiters and holder list 250 (the local copy). If the determination at block 940 is true, then at least one node, other than the node at which the issuing thread 134 executes, is identified in the waiters and holder list 250 (the local copy) so control continues to block 915, as previously described above. If the determination at block 940 is false, then no node (other than possibly the node at which the issuing thread 134 executes) is identified in the waiters and holder list 250 (the local copy), so control continues to block 945 where the issuing thread 134 attempts to atomically clear the global pending waiters list 255, i.e., delete all content in the global pending waiters list 255. Control then continues to block 950 where the issuing thread 134 determines whether the attempted clear of the global pending waiters list 255 was successful. If the determination at block 950 is true, then the clear of the global pending waiters list 255 is successful, so control continues to block 930, as previously described above. If the determination at block 950 is false, then the clear of the global pending waiters list 255 was unsuccessful, as another thread accessed the global pending waiters list 255 at the same time as the attempted clear by the issuing thread 134, so control returns to block 905, as previously described above.

Figure 10:
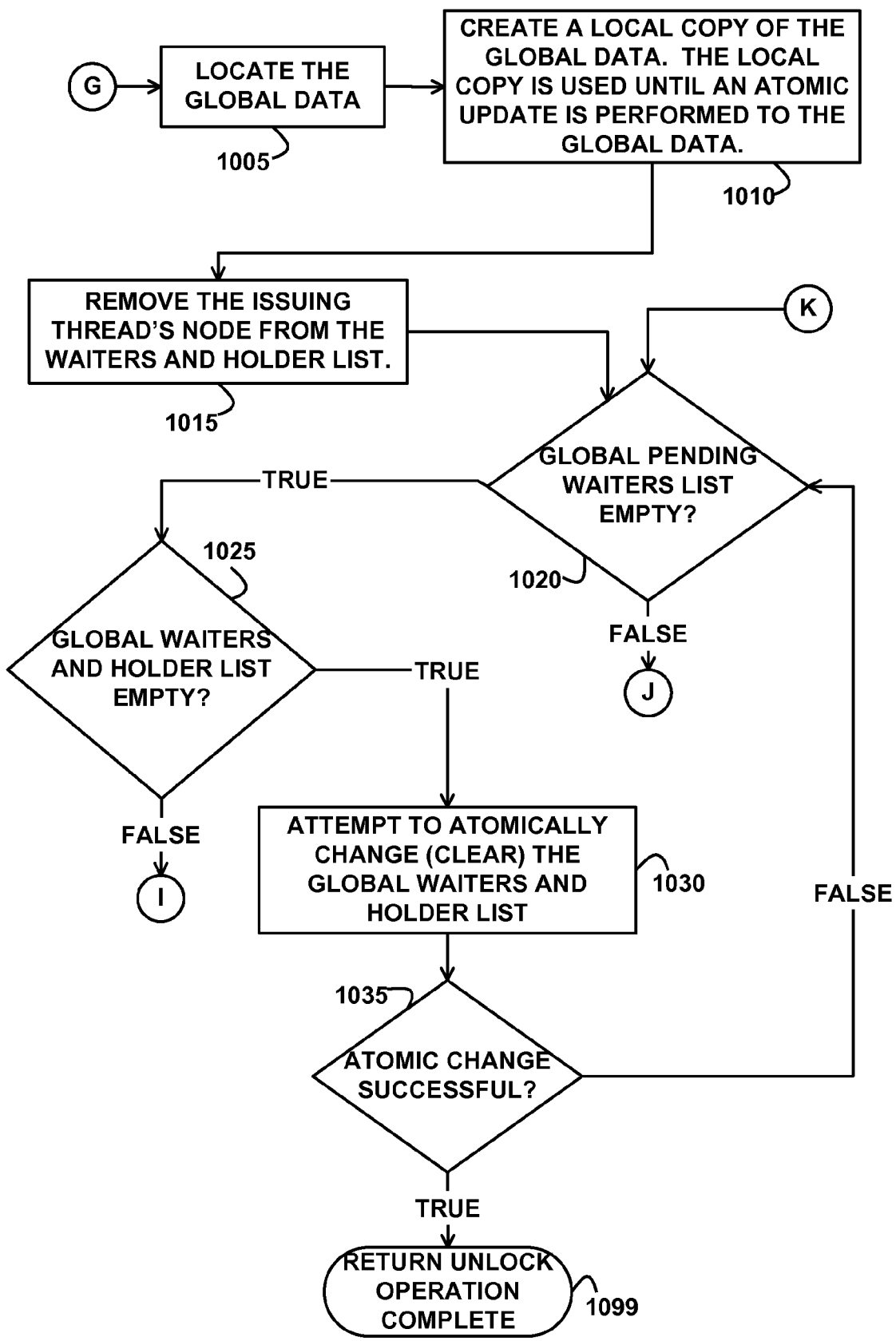
FIG. 10 depicts a flowchart of further example processing for unlocking, according to an embodiment of the invention.

FIG. 10 depicts a flowchart of further example processing for unlocking, according to an embodiment of the invention. Control flow enters the logic of FIG. 10 at block 1005 from the true leg of block 725 of FIG. 7. At block 1005, the issuing thread 134 locates the global data for the requested tiered lock. Control then continues to block 1010 where the issuing thread 134 creates a local copy of the global data. The issuing thread 134 uses the local copy of the global data until the issuing thread 134 performs an atomic update of the global data, as further described below. Control then continues to block 1015 where the issuing thread 134 removes the identifier of the node at which the issuing thread 134 executes from the waiters and holder list 250 in the local copy of the global data. Control then continues to block 1020 where the issuing thread 134 determines whether the global pending waiters list 255 (local copy) is empty. If the determination at block 1020 is true, then the global pending waiters list 255 (local copy) is empty, so control continues to block 1025 where the issuing thread 134 determines whether the global waiters and holder list 250 (local copy) is empty. If the determination at block 1025 is true, then the global waters and holder list (local copy) is empty, so control continues to block 1030 where the issuing thread 134 attempts to atomically change (clear or remove all identifiers from) the global waiters and holder list 250. Control then continues to block 1035 where the issuing thread 134 determines whether the attempted clear of the global waiters and holder list 250 is successful. If the determination at block 1035 is true, then the clear of the global waiters and holder list 250 is successful, so control continues to block 1099 where the issuing thread 134 returns a successful unlock operation completion status to the issuing thread 134, and the issuing thread is no longer allowed to access the unlocked resource. If the determination at block 1035 is false, then the atomic change (clear) of the global waiters and holder list 250 was not successful, so control returns to block 1020, as previously described above.

If the determination at block 1025 is false, then the global waiters and holder list 250 is not empty, so control continues to block 1105 of FIG. 11, as further described below. If the determination at block 1020 is false, then the global pending waiters list 255 (local copy) is not empty, so control continues to block 1130 of FIG. 11, as further described below.

Figure 11:
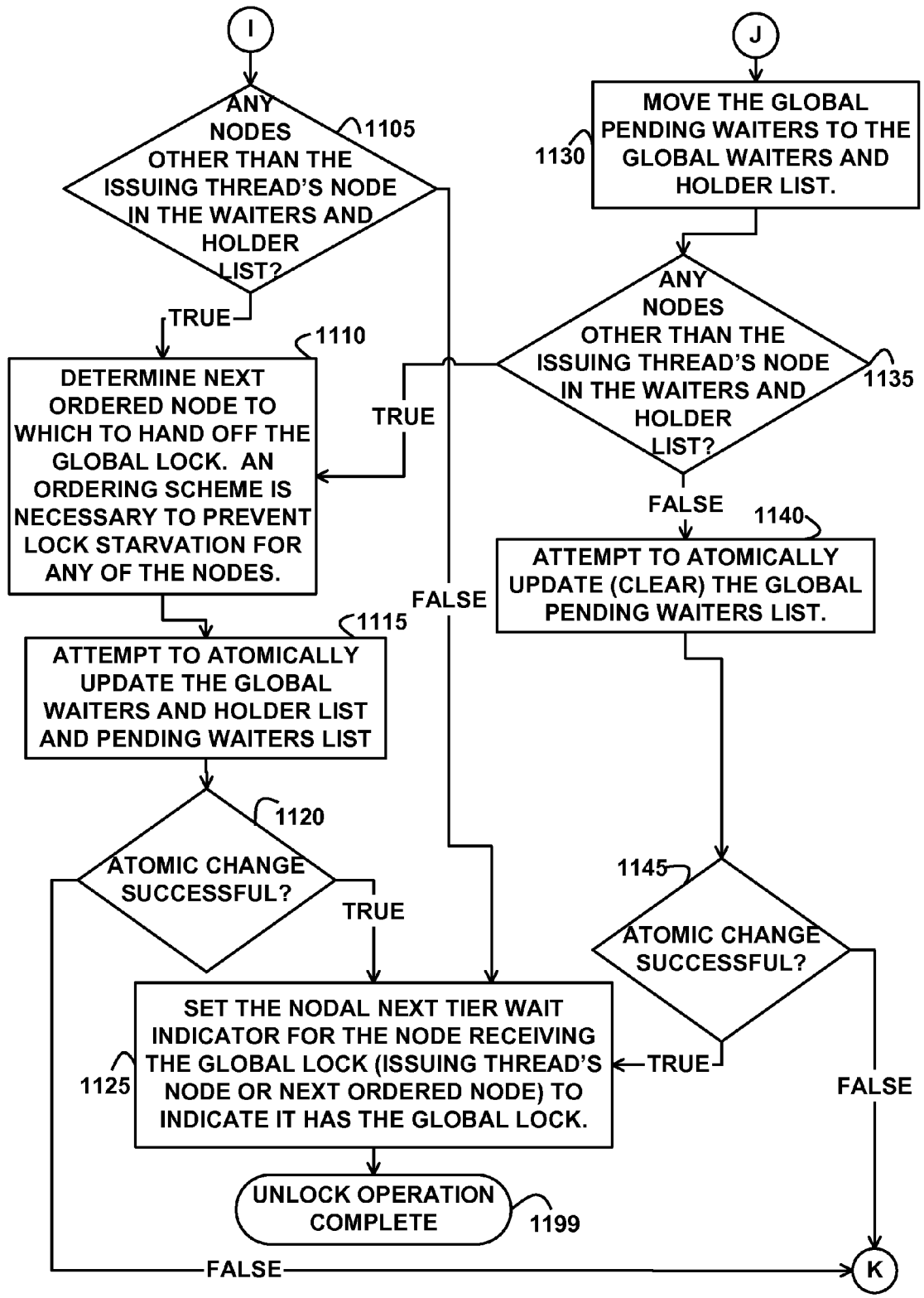
FIG. 11 depicts a flowchart of further example processing for unlocking, according to an embodiment of the invention.

FIG. 11 depicts a flowchart of further example processing for unlocking, according to an embodiment of the invention. Control flow enters the logic of FIG. 11 at block 1105 from block 1025 of FIG. 10. At block 1105, the issuing thread 134 determines whether any node, other than the node at which the issuing thread 134 executes, is identified in the waiters and holder list 250. If the determination at block 1105 is true, then at least one node, other than the node at which the issuing thread 134 executes, is identified in the waiters and holder list 250, so control continues to block 1110 where the issuing thread 134 determines the next ordered node to which to hand off the global lock, in the ordered list of nodes. Control then continues to block 1115 where the issuing thread 134 attempts to atomically update the global waiters and holder list 250 and the pending waiters list 255 with the local copy of the global data. That is, the issuing thread 134 attempts to copy the local copy of the global data to the global data. Control then continues to block 1120 where the issuing thread 134 determines whether the attempted copy of the local copy of the global data to the global data is successful. If the determination at block 1120 is true, then the issuing thread 134 successfully copied the local copy of the global data to the global data, so control continues to block 1125 where the issuing thread 134 sets the next tier wait indicator 230 or 245 for the node receiving the global lock (the issuing thread's node or next ordered node, depending on which node received the global lock) to indicate that node owns the global lock 215. Control then continues to block 1199 where the issuing thread 134 returns a successful unlock operation completion status, indicating that the unlock operation was successful, and the issuing thread is no longer allowed to access the unlocked resource. If the determination at block 1120 is false, then the atomic change to the global waiters and holder list 250 and the pending waiters list 255 was not successful, as another thread accessed the global data at the same time as the issuing thread 134, so control continues to block 1020 of FIG. 10, as previously described above.

If the determination at block 1105 is false, then either the waiters and holder list 250 is empty or the waiters and holder list 250 only comprises an identifier of the node at which the issuing thread 134 executes, so control continues to block 1125 where the issuing thread 134 sets the nodal next tier wait indicator 230 or 245 to indicate that the node at which the issuing thread executes owns the global lock 215. Control then continues to block 1199 where the issuing thread 134 returns a successful unlock operation completion status, indicating that the unlock operation was successful.

Control flow also enters the logic of FIG. 11 at block 1130 from the false leg of block 1020 of FIG. 10. At block 1130, the issuing thread 134 moves the global pending waiters (identifiers of nodes) in the global pending waiters list 255 (local copy) to the global waiters and holder list 250 (local copy), clearing the global pending waiters list 255 (local copy) after the move. Control then continues to block 1135 where the issuing thread 134 determines whether any node, other than the node at which the issuing thread 134 executes, is identified in the waiters and holder list 250 (local copy). If the determination at block 1135 is true, then at least one node, other than the node at which the issuing thread 134 executes, is identified in the waiters and holder list 250 (local copy), so control continues to block 1110, as previously described above. If the determination at block 1135 is false, then either the waiters and holder list 250 (local copy) is empty or the waiters and holder list 250 (local copy) only comprises an identifier of the node at which the issuing thread 134 executes, so control continues to block 1140 where the issuing thread 134 attempts to atomically update (attempts to clear or remove all identifiers from) the global pending waiters list 255. Control then continues to block 1145 where the issuing thread 134 determines whether the atomic clearing of the global pending waiters list 255 was successful. If the determination at block 1145 is true, then the clearing of the global pending waiters list 255 was successful, so control continues to block 1125, as previously described above, where the issuing thread 134 sets the nodal next tier wait indicator for the node at which the issuing thread executes to indicate that node owns the global lock on the requested resource. If the determination at block 1145 is false, then the attempted atomic clearing of the global pending waiters list 255 was not successful, as another thread was accessing the global pending waiters list 255 at the same time as the attempted atomic clearing, so control continues to block 1020 of FIG. 10, as previously described above.

In this way, in an embodiment, in an embodiment, a locking protocol is provided that reduces the overall contention on a lock allowing the holder of the lock to easily update and release the lock. This is achieved by dividing the overall lock into multiple data blocks accessed by a subset of threads on the system in a tiered hierarchy. In an embodiment, the contention is therefore reduced on each tier of the lock by limiting the subset of threads that needs to access each tier, which improves the performance of locking and unlocking share resources. To obtain the overall lock, a thread obtains the lock at all tiered levels. A tiered hierarchy is combined with the maintenance of waiter lists and localized wait indicators. Each thread waiting to obtain a tier of the lock that is currently locked places itself on a waiters list and then waits for its localized wait indicator to indicate the thread has obtained the tier, reducing the contention on the shared data blocks. In an embodiment, the lock is divided into two tiers, where the first tier is accessed by a subset of threads located within an affinity domain of the system, and the second tier is accessed by at most one thread from each domain at a given time. In other embodiments, any number of tiers may be used.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
receiving, from a first thread, a lock command that specifies a resource;
if tier status in a nodal lock indicates the nodal lock is currently owned on global data, adding an identifier of the first thread to a nodal waiters list in the nodal lock, and if a lock wait indicator in the first thread indicates that the first thread owns the nodal lock on the global data, waiting until a next tier wait indicator in the nodal lock indicates that any thread owns a global lock on the resource and then returning a successful completion status for the lock command to the first thread;
if the tier status indicates no thread holds the nodal lock on the global data, changing the tier status to indicate the nodal lock is owned, and if a global waiters and holder list in the global data is empty, adding an identifier of a first node at which the first thread executes to the global waiters and holder list, and returning the successful completion status for the lock command to the first thread;
if the tier status indicates no thread holds the nodal lock on the global data, changing the tier status to indicate the nodal lock is owned, and if the identifier of the first node at which the first thread executes is in the global waiters and holder list, adding the identifier of the first node at which the first thread executes to a global pending waiters list in the global data, and returning the successful completion status for the lock command to the first thread; and
if the tier status indicates no thread holds the nodal lock on the global data, changing the tier status to indicate the nodal lock is owned, and if the identifier of the first node at which the first thread executes is not in the global waiters and holder list, adding the identifier of the first node at which the first thread executes to the global waiters and holder list, and returning the successful completion status for the lock command to the first thread.

2. The method of claim 1, further comprising:

If the tier status indicates that no thread owns the nodal lock on the global data, changing the tier status to indicate the nodal lock is owned, and if the global waiters and holder list is not empty and the lock command is a try lock attempt command and the nodal waiters list is empty, changing the tier status in the nodal lock to indicate that no thread owns the nodal lock and returning a failure completion status for the lock command to the first thread.

3. The method of claim 2, further comprising:

if the tier status indicates that no thread owns the nodal on the global data, changing the tier status to indicate that the nodal lock is owned, and if the global waiters and holder list is not empty and the lock command is a try lock attempt command and the nodal waiters list is not empty, determining a next ordered nodal thread in a thread order to which to hand off the nodal lock, removing an identifier of the next ordered nodal thread from the nodal waiters list, setting a lock wait indicator in the next ordered nodal thread to indicate the next ordered nodal thread obtained the nodal lock from the first thread that issued the try lock attempt command, and returning a failure completion status for the lock command to the first thread.

4. The method of claim 2, further comprising:

receiving, from the first thread, an unlock command that specifies the resource; and if the nodal waiters list is empty, changing the tier status to indicate the nodal lock is not held, removing the identifier of the first thread from the global waiters and holder list and if the global pending waiters list and the global waiters and holder list are empty, returning a successful completion status for the unlock command to the first thread.

5. The method of claim 4, further comprising:

if the global pending waiters list is not empty, moving identifiers of nodes from the global pending waiters list to the global waiters and holder list;

if any node other than the first node is identified in the global waiters and holder list, determined a next ordered node to which to hand off the global lock, setting a nodal next tier wait indicator at the next ordered node receiving the global lock to indicate the next ordered node owns the global lock, and returning a successful completion status for the unlock command to the first thread; and if only the first node at which the first thread executes is identified in the global waiters and holder list, clearing the global pending waiters list.

6. The method of claim 4, further comprising:

if the nodal waiters list is not empty, determining a next ordered nodal thread to which to hand off the nodal lock, removing the next ordered nodal thread from the nodal waiters list, and if the next ordered nodal thread is after the first thread in the thread order, setting a lock wait indicator in the next ordered nodal thread to indicate that the next ordered nodal thread owns the nodal lock and the global lock and returning a successful completion status for the unlock command to the first thread; and if the next ordered nodal thread is before the first thread in the thread order, setting the lock wait indicator in the next ordered nodal thread to indicate that the next ordered nodal thread owns the nodal lock, and if the global pending waiters list is empty, setting the next tier wait indicator for the first thread to indicate that the first thread owns the global lock and returning the successful completion status for the unlock command to the first thread.

7. The method of claim 4, further comprising:

If the global pending waiters list is not empty, moving node identifiers from the global pending waiters list to the global waiters and holders list, and if only an identifier of the first node at which the first node executes is present in the global pending waiters list, clearing the global pending waiters list, setting the next tier wait indicator for the first node at which the first thread executes to indicate that the first thread owns the global lock, and returning the successful completion status for the unlock command to the first thread.

8. A non-transitory computer-readable storage medium encoded with instructions, wherein the instructions when executed by a computer comprise:

receiving, from a first thread, a lock command that specifies a resource;

if tier status in a nodal lock indicates the nodal lock is currently owned on global data, adding an identifier of the first thread to a nodal waiters list in the nodal lock, and if a lock wait indicator in the first thread indicates that the first thread owns the nodal lock on the global data, waiting until a next tier wait indicator in the nodal lock indicates that any thread owns a global lock on the resource and then returning a successful completion status for the lock command to the first thread;

if the tier status indicates no thread holds the nodal lock on the global data, changing the tier status to indicate the nodal lock is owned, and if a global waiters and holder list in the global data is empty, adding an identifier of a first node at which the first thread executes to the global waiters and holder list, and returning the successful completion status for the lock command to the first thread;

if the tier status indicates no thread holds the nodal lock on the global data, changing the tier status to indicate the nodal lock is owned, and if the identifier of the first node at which the first thread executes is in the global waiters and holder list, adding the identifier of the first node at which the first thread executes to a global pending waiters list in the global data, and returning the successful completion status for the lock command to the first thread; and if the tier status indicates no thread holds the nodal lock on the global data, changing the tier status to indicate the nodal lock is owned, and if the identifier of the first node at which the first thread executes is not in the global waiters and holder list, adding the identifier of the first node at which the first thread executes to the global waiters and holder list, and returning the successful completion status for the lock command to the first thread.

9. The non-transitory computer-readable storage medium of claim 8, further comprising:

if the tier status indicates that no thread owns the nodal lock on the global data, changing the tier status to indicate the nodal lock is owned, and if the global waiters and holder list is not empty and the lock command is a try lock attempt command and the nodal waiters list is empty, changing the tier status in the nodal lock to indicate that no thread owns the nodal lock and returning a failure completion status for the lock command to the first thread.

10. The non-transitory computer-readable storage medium of claim 9, further comprising:
if the tier status indicates that no thread owns the nodal on the global data, changing the tier status to indicate that the nodal lock is owned, and if the global waiters and holder list is not empty and the lock command is a try lock attempt command and the nodal waiters list is not empty, determining a next ordered nodal thread in a thread order to which to hand off the nodal lock, removing an identifier of the next ordered nodal thread from the nodal waiters list, setting a lock wait indicator in the next ordered nodal thread to indicate the next ordered nodal thread obtained the nodal lock from the first thread that issued the try lock attempt command, and returning a failure completion status for the lock command to the first thread.

11. The non-transitory computer-readable storage medium of claim 9, further comprising:
receiving, from the first thread, an unlock command that specifies the resource; and
if the nodal waiters list is empty, changing the tier status to indicate the nodal lock is not held, removing the identifier of the first thread from the global waiters and holder list and if the global pending waiters list and the global waiters and holder list are empty, returning a successful completion status for the unlock command to the first thread.

12. The non-transitory computer-readable storage medium of claim 11, further comprising:
if the global pending waiters list is not empty, moving identifiers of nodes from the global pending waiters list to the global waiters and holder list;
if any node other than the first node is identified in the global waiters and holder list, determined a next ordered node to which to hand off the global lock, setting a nodal next tier wait indicator at the next ordered node receiving the global lock to indicate the next ordered node owns the global lock, and returning a successful completion status for the unlock command to the first thread; and
if only the first node at which the first thread executes is identified in the global waiters and holder list, clearing the global pending waiters list.

13. The non-transitory computer-readable storage medium of claim 11, further comprising:
if the nodal waiters list is not empty, determining a next ordered nodal thread to which to hand off the nodal lock, removing the next ordered nodal thread from the nodal waiters list, and if the next ordered nodal thread is after the first thread in the thread order, setting a lock wait indicator in the next ordered nodal thread to indicate that the next ordered nodal thread owns the nodal lock and the global lock and returning a successful completion status for the unlock command to the first thread; and
if the next ordered nodal thread is before the first thread in the thread order, setting the lock wait indicator in the next ordered nodal thread to indicate that the next ordered nodal thread owns the nodal lock, and if the global pending waiters list is empty, setting the next tier wait indicator for the first thread to indicate that the first thread owns the global lock and returning the successful completion status for the unlock command to the first thread.

14. The non-transitory computer-readable storage medium of claim 11, further comprising:
if the global pending waiters list is not empty, moving node identifiers from the global pending waiters list to the global waiters and holders list, and if only an identifier of the first node at which the first node executes is present in the global pending waiters list, clearing the global pending waiters list, setting the next tier wait indicator for the first node at which the first thread executes to indicate that the first thread owns the global lock, and returning the successful completion status for the unlock command to the first thread.

15. A computer comprising:
a processor; and
memory communicatively coupled to the processor, wherein the memory is encoded with instructions, wherein the instructions when executed by the processor comprise
receiving, from a first thread, a lock command that specifies a resource,
if tier status in a nodal lock indicates the nodal lock is currently owned on global data, adding an identifier of the first thread to a nodal waiters list in the nodal lock, and if a lock wait indicator in the first thread indicates that the first thread owns the nodal lock on the global data, waiting until a next tier wait indicator in the nodal lock indicates that any thread owns a global lock on the resource and then returning a successful completion status for the lock command to the first thread,
if the tier status indicates no thread holds the nodal lock on the global data, changing the tier status to indicate the nodal lock is owned, and if a global waiters and holder list in the global data is empty, adding an identifier of a first node at which the first thread executes to the global waiters and holder list, and returning the successful completion status for the lock command to the first thread,
if the tier status indicates no thread holds the nodal lock on the global data, changing the tier status to indicate the nodal lock is owned, and if the identifier of the first node at which the first thread executes is in the global waiters and holder list, adding the identifier of the first node at which the first thread executes to a global pending waiters list in the global data, and returning the successful completion status for the lock command to the first thread,
if the tier status indicates no thread holds the nodal lock on the global data, changing the tier status to indicate the nodal lock is owned, and if the identifier of the first node at which the first thread executes is not in the global waiters and holder list, adding the identifier of the first node at which the first thread executes to the global waiters and holder list, and returning the successful completion status for the lock command to the first thread, and
if the tier status indicates that no thread owns the nodal lock on the global data, changing the tier status to indicate the nodal lock is owned, and if the global waiters and holder list is not empty and the lock command is a try lock attempt command and the nodal waiters list is empty, changing the tier status in the nodal lock to indicate that no thread owns the nodal lock and returning a failure completion status for the lock command to the first thread.

16. The computer of claim 15, wherein the instructions further comprise:
if the tier status indicates that no thread owns the nodal on the global data, changing the tier status to indicate that the nodal lock is owned, and if the global waiters and holder list is not empty and the lock command is a try lock attempt command and the nodal waiters list is not empty, determining a next ordered nodal thread in a thread order to which to hand off the nodal lock, removing an identifier of the next ordered nodal thread from the nodal waiters list, setting a lock wait indicator in the next ordered nodal thread to indicate the next ordered nodal thread obtained the nodal lock from the first thread that issued the try lock attempt command, and returning a failure completion status for the lock command to the first thread.

17. The computer of claim 15, wherein the instructions further comprise:
    receiving, from the first thread, an unlock command that specifies the resource; and
    if the nodal waiters list is empty, changing the tier status to indicate the nodal lock is not held, removing the identifier of the first thread from the global waiters and holder list and if the global pending waiters list and the global waiters and holder list are empty, returning a successful completion status for the unlock command to the first thread.

18. The computer of claim 17, wherein the instructions further comprise:
    if the global pending waiters list is not empty, moving identifiers of nodes from the global pending waiters list to the global waiters and holder list;
    if any node other than the first node is identified in the global waiters and holder list, determined a next ordered node to which to hand off the global lock, setting a nodal next tier wait indicator at the next ordered node receiving the global lock to indicate the next ordered node owns the global lock, and returning a successful completion status for the unlock command to the first thread; and
    if only the first node at which the first thread executes is identified in the global waiters and holder list, clearing the global pending waiters list.

19. The computer of claim 17, wherein the instructions further comprise:
    if the nodal waiters list is not empty, determining a next ordered nodal thread to which to hand off the nodal lock, removing the next ordered nodal thread from the nodal waiters list, and if the next ordered nodal thread is after the first thread in the thread order, setting a lock wait indicator in the next ordered nodal thread to indicate that the next ordered nodal thread owns the nodal lock and the global lock and returning a successful completion status for the unlock command to the first thread; and
    if the next ordered nodal thread is before the first thread in the thread order, setting the lock wait indicator in the next ordered nodal thread to indicate that the next ordered nodal thread owns the nodal lock, and if the global pending waiters list is empty, setting the next tier wait indicator for the first thread to indicate that the first thread owns the global lock and returning the successful completion status for the unlock command to the first thread.

20. The computer of claim 17, wherein the instructions further comprise:
    If the global pending waiters list is not empty, moving node identifiers from the global pending waiters list to the global waiters and holders list, and if only an identifier of the first node at which the first node executes is present in the global pending waiters list, clearing the global pending waiters list, setting the next tier wait indicator for the first node at which the first thread executes to indicate that the first thread owns the global lock, and returning the successful completion status for the unlock command to the first thread.

* * * * *